(12) United States Patent
Kelm et al.

(10) Patent No.: US 12,332,834 B2
(45) Date of Patent: Jun. 17, 2025

(54) UNIVERSAL SERIAL BUS TIME SYNCHRONIZATION

(71) Applicant: APPLE INC., Cupertino, CA (US)

(72) Inventors: John H Kelm, Belmont, CA (US); Alexei E Kosut, Campbell, CA (US); Yi Chun Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 18/334,394

(22) Filed: Jun. 14, 2023

(65) Prior Publication Data

US 2023/0325344 A1 Oct. 12, 2023

Related U.S. Application Data

(63) Continuation of application No. 17/535,590, filed on Nov. 25, 2021, now Pat. No. 11,720,520.

(60) Provisional application No. 63/243,757, filed on Sep. 14, 2021.

(51) Int. Cl.
 *G06F 13/42* (2006.01)
 *G06F 1/12* (2006.01)

(52) U.S. Cl.
 CPC ............ *G06F 13/4295* (2013.01); *G06F 1/12* (2013.01); *G06F 2213/0042* (2013.01)

(58) Field of Classification Search
 CPC ..................................................... G16H 40/67
 See application file for complete search history.

(56) References Cited

U.S. PATENT DOCUMENTS

| 11,463,253 B2 * | 10/2022 | Shah | ........................ G06F 21/64 |
| 2014/0059267 A1 * | 2/2014 | Lai | ....................... G06F 13/4059 |
| | | | 710/313 |
| 2017/0257247 A1 * | 9/2017 | Zhao | ................... H04L 27/2692 |

\* cited by examiner

*Primary Examiner* — Henry Tsai
*Assistant Examiner* — Juanito C Borromeo
(74) *Attorney, Agent, or Firm* — Meitar Patents Ltd.; Daniel Kligler (57) ABSTRACT

An apparatus includes components, a distributed timebase circuit, an interface and a Time Synchronization Circuit (TSC). The timebase circuit is configured to provide local timebases in physical proximity to the components, and synchronize the local timebases to a global timebase so as to provide a consistent time measurement. The interface is configured to be coupled to one or more devices. Transmissions on the interface are logically divided into a plurality of frames. Time on the interface is defined based on a frame number identifying a particular frame. The TSC is configured to capture a first timestamp based on the frame number corresponding to a point in time on the interface, and to concurrently capture a second timestamp based on a local timebase corresponding to the point in time, wherein the first timestamp and the second timestamp correlate time on the interface to the consistent time measurement.

19 Claims, 6 Drawing Sheets

FIG. 1

FIG. 2A  SOC is USB host

FIG. 2B  SOC is a USB device

UNIVERSAL SERIAL BUS TIME SYNCHRONIZATION

CROSS-REFERENCE TO RELATED APPLICATION

This application is a continuation of U.S. patent application Ser. No. 17/535,590, filed Nov. 25, 2021, which claims the benefit of U.S. Provisional Patent Application 63/243,757, filed Sep. 14, 2021. The disclosures of these related applications are incorporated herein by reference.

TECHNICAL FIELD

The present disclosure relates generally to integrated circuits, and specifically to synchronization of integrated circuit timebases.

BACKGROUND

Computer applications often rely on precise and synchronized timebases in various interconnected devices, as well as in various circuits in the same integrated circuit.

U.S. Pat. No. 7,801,258 discloses a system and method for aligning a local timebase to a remote timebase given a timebase error value from a higher-level protocol, and using the aligned timebases to generate and distribute synchronized events and synchronized adjustable frequency periodic signals across a domain using the aligned timebases, wherein a periodic signal used to count time is slightly sped-up or slowed down, to align a local timebase to a remote timebase when given an error value from a higher-level protocol.

U.S. Pat. No. 6,993,102 discloses a method for adaptive synchronization of a data sink device to a data source device coupled by a Universal Synchronous Bus (USB), wherein data is received and stored in a buffer of the sink device at an average data rate representative of the data rate of the source device. A data level for the buffer is determined based on input packet size and output packet size. An accumulated data level for the buffer is compared with a threshold level. A clock frequency for the sink device is corrected when the accumulated data level exceeds the threshold level.

Lastly, in "IEEE-1588™ Standard for Precision Clock Synchronization Protocol for Network Management and Control Systems," Proceedings of the 34$^{th}$ Annual Precise Time and Time Interval Systems and Applications Meeting, December 2002, pages 243-254, Eidson et al., discuss the major features and design objectives of the IEEE-1588 standard, and present performance results of prototype implementations of this standard in an Ethernet environment.

SUMMARY

An embodiment that is described herein provides an apparatus including a plurality of components, a distributed timebase circuit, an interface and a Time Synchronization Circuit (TSC). The distributed timebase circuit is configured to (i) provide a plurality of local timebases in physical proximity to the plurality of components, and (ii) synchronize the local timebases to a global timebase so as to provide a consistent time measurement throughout the apparatus. The interface is configured to be coupled to one or more devices. Transmissions on the interface are logically divided into a plurality of frames, and time on the interface is defined based on a frame number identifying a particular frame of the plurality of frames. The TSC is configured to capture a first timestamp based on the frame number corresponding to a point in time on the interface and to concurrently capture a second timestamp based on a given local timebase of the plurality of local timebases corresponding to the point in time, wherein the first timestamp and the second timestamp correlate time on the interface to the consistent time measurement.

In some embodiments, the interface is a Universal Serial Bus (USB). In a disclosed embodiment, the TSC is configured to capture the first timestamp corresponding to a point in time at which the frame number on the interface changes. In an example embodiment, the interface is Universal Serial Bus 2 (USB 2), and the TSC is configured to capture the first timestamp corresponding to a point in time in which the interface sends a Start-Of-Frame (SOF) packet. In another embodiment, the interface is Universal Serial Bus 3 (USB 3), and the TSC is configured to capture the first timestamp corresponding to a point in time in which the interface sends an Isochronous Timestamp Packet (ITP). In an embodiment, the interface is configured to send Link Delay Measurement (LDM) packets to increase an accuracy of the ITP.

In some embodiments, the apparatus includes the one or more devices. In an embodiment, the TSC, the components, the distributed timebase circuit and the interface are included in a single Integrated Circuit (IC). In a disclosed embodiment, the components include at least one component type selected from a group of types consisting of (i) a Reduced Instruction-Set Processor (RISC), a Digital Signal Processor (DSP), a wireless modem and a memory.

In some embodiments, the TSC includes a Start-of-Frame (SOF) detection circuit that is configured to detect an SOF indicating a change in the frame number on the interface, and the TSC is configured to capture the first timestamp and the second timestamp responsively to detection of the SOF. In an embodiment, the apparatus further includes a CPU that is configured to send a read request to the TSC, and the TSC is configured to send a coherent capture of the first timestamp and the second timestamp responsively to the CPU read request.

In some embodiments, a device among the one or more devices includes a Flash device that is configured to generate a flash of light in synchronization with the first timestamp, a component among the components includes an image sensor that is configured to capture an image in synchronization with the second timestamp, and the TSC is configured to synchronize the flash of light and capturing of the image according to a difference between the first timestamp and the second timestamp. In an embodiment, the apparatus further includes a memory, the image sensor is configured to store a sequence of images in the memory with multiple respective second timestamps, and the TSC is configured to retroactively synchronize the flash of light to one of the stored images in the memory according to differences between the first timestamp and the second timestamps.

There is additionally provided, in accordance with an embodiment that is described herein, a method including, using a distributed timebase circuit, (i) providing a plurality of local timebases in physical proximity to a plurality of components, and (ii) synchronizing the local timebases to a global timebase so as to provide a consistent time measurement. Communication is carried out between the plurality of components and one or more devices via an interface, wherein transmissions on the interface are logically divided into a plurality of frames, and wherein time on the interface is defined based on a frame number identifying a particular frame of the plurality of frames. Using a Time Synchronization Circuit (TSC), a first timestamp is captured based on the frame number corresponding to a point in time on the interface, and a second timestamp is concurrently captured based on a given local timebase of the plurality of local timebases corresponding to the point in time, wherein the first timestamp and the second timestamp correlate time on the interface to the consistent time measurement.

There is further provided, in accordance with an embodiment that is described herein, a non-transitory computer readable storage medium having stored thereon design information that specifies a design of at least a portion of a hardware integrated circuit in a format recognized by a semiconductor fabrication system that is configured to use the design information to produce the circuit according to the design. The design information specifies that the circuit includes: a plurality of components, a distributed timebase circuit, which is configured to (i) provide a plurality of local timebases in physical proximity to the plurality of components, and (ii) synchronize the local timebases to a global timebase so as to provide a consistent time measurement throughout the hardware integrated circuit, an interface, which is configured to be coupled to one or more devices, wherein transmissions on the interface are logically divided into a plurality of frames, and wherein time on the interface is defined based on a frame number identifying a particular frame of the plurality of frames, and a Time Synchronization Circuit (TSC), configured to capture a first timestamp based on the frame number corresponding to a point in time on the interface and to concurrently capture a second timestamp based on a given local timebase of the plurality of local timebases corresponding to the point in time, wherein the first timestamp and the second timestamp correlate time on the interface to the consistent time measurement.

The present disclosure will be more fully understood from the following detailed description of the embodiments thereof, taken together with the drawings in which:

DETAILED DESCRIPTION OF EMBODIMENTS

Overview

Typically, complex integrated circuits (e.g., Systems on Chip, or SOC) use one or more timebases that are synchronized to each other. Techniques for the synchronization of timebases in an SOC are described, for example, in U.S. Pat. No. 10,048,720.

Some SOCs may include controllers for communicating over a Universal Serial Bus (USB), with one or more USB components that are external to the SOC. For example, the SOC of a smartphone, a tablet or a computer may communicate with a USB flash drive, with an external USB camera, with an external USB flash-light, with USB speakers, and with many others. An SOC may include a host-USB interface (e.g., when the SOC is in a computer), a device-USB interface (e.g., when the SOC is in a smartphone), or a configurable host/device interface.

Several versions of the USB exist, with different protocols; all have inherent timebases and use timestamps to indicate the time of events (e.g., when a USB flash-light generates a flash). In the various USB protocols, periodic synchronization packets are transmitted from the host-USB to the USB devices, to synchronize the USB network to the host timebase. In some USB protocols (e.g., USB 2), the hosts periodically send a Start-of-Frame (SOF) packet to the devices. In USB3 protocols the host sends Isochronous Timestamp Packets (ITPs); optionally, the accuracy of the ITP may be increased, using a Link Delay Measurement (LDM) protocol.

Embodiments according to the present disclosure provide for apparatuses and methods wherein the SOC synchronizes the USB timebase to the SOC timebase. In some embodiments, the SOC includes a Time-Synchronization Circuit (TSC), which captures the USB timebase and the SOC timebase in timebase capture registers; in embodiments, the TSC captures the timebases when (or shortly after, or shortly before) the USB host sends a synchronization packet (e.g., SOF or ITP).

In an embodiment, by reading the timebase capture registers, a CPU in the SOC can align any USB timestamps to SOC timestamps, and vice-versa, thereby synchronizing the timebases. In some embodiments, the alignment of the USB timebase to the SOC timebase allows "retroactive synchronization", wherein timestamped events that occurred prior to the synchronization can be retroactively aligned to each other after the timebases are synchronized. Retroactive synchronization may be useful when the events are stored in memory; for example, in embodiments, a continuous stream of timestamped pictures is stored in memory, a USB flash-light illuminates the picture by a single flash, and then sends a timestamped flash event to a CPU. The CPU can then retroactively determine which picture in memory is synchronized to the flash event.

Thus, embodiments according to the present disclosure allow synchronization of a USB timebase to the SOC timebase, easing the implementation of applications that require time alignment of audible, visible and other events that the SOC may handle.

Description of Example Embodiments

Figure 1:
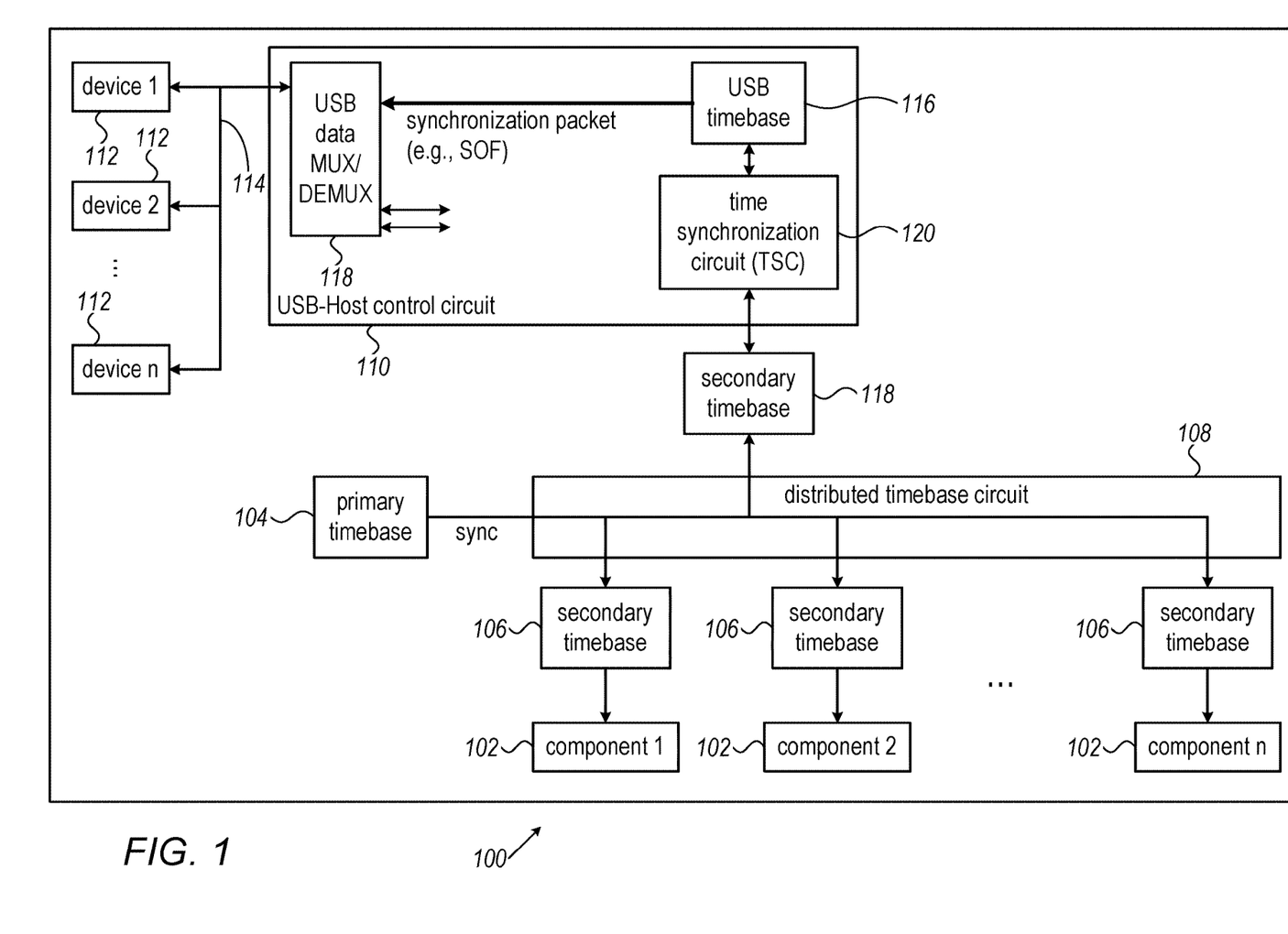
FIG. 1 is a block diagram that schematically illustrates the structure of a System on Chip (SOC), in accordance with an embodiment that is described herein.

FIG. 1 is a block diagram that schematically illustrates the structure of a System on Chip (SOC) 100, in accordance with an embodiment that is described herein. Although in the embodiments below will refer to SOCs and, in general, to Integrated Circuits (ICs), the present disclosure refers more broadly to apparatuses, and may include other suitable apparatuses, e.g., a Multi-Chip Model (MCM).

SOC 100 may be any suitable type of IC that is configured to carry out any suitable function, e.g., a microprocessor, a video processor or any other. The SOC includes a plurality of components 102; in typical SOCs the components may be complex and include subsystems such as Reduced Instruction-Set Processors (RISCs), Digital Signal Processors (DSPs), wireless modems, memories, and many others.

SOC 100 includes a primary timebase 104, operable to keep a global time indication. In embodiments, primary timebase 104 comprises a precision oscillator and counters; in some embodiments, the primary timebase is periodically synchronized to a universal time clock, e.g., through a network connection.

SOC 100 may be large and, hence, routing the primary timebase counter to all components 102 may be impractical. Instead, some (or all) components 102 are coupled to secondary timebases 106 (each time base spatially close to the corresponding component 102), operable to keep a time indication. Like primary timebase 104, secondary timebases 106 include counters that count time.

Due to various inaccuracies (e.g., different oscillators), time indications may vary between the secondary timebases, and between the secondary timebases and the primary timebase; in an embodiment, the various timebases are periodically aligned, and the maximum difference between the timebases is kept low, so as not to disrupt the operation of the SOC.

To keep the maximum difference between the timebases low, SOC 100 comprises a distributed timebase circuit (DTC) 108. The DTC receives a sync input from primary timebase 104, for example, once every 1 ms. The secondary timebases receive the sync signal and may, responsively, round the secondary timebases to the closest 1 ms count. For example, if a primary timebase that counts microseconds is at a count 603,037 when receiving a sync signal, the counter will set to 603,000 (603 ms); if the counter is at 699,970, the counter will set to 700,000 (700 ms).

In embodiments, it may be helpful to synchronize the timebases of devices which are coupled to the SOC to the SOC timebase (e.g., to the primary timebase). In the example embodiment illustrated in FIG. 1, SOC 100 includes a host Universal Serial Bus (USB) control circuit 110, for communicating with USB devices 112 that are coupled to SOC 100 through a USB 114. It should be noted that USB communication takes place between a USB host and one or more USB devices; according to the example embodiment illustrated in FIG. 1, SOC 100 includes a host-USB control circuit, for communicating with USB devices outside the SOC; in other embodiments, the SOC may include a device USB control circuit, for communicating with a host USB outside the SOC; and, in yet other embodiments the SOC may comprise a plurality of USB control circuits, including hosts and devices.

Various types of USB are defined, including USB 2.0, USB 3.0, USB 3.1 and USB 3.2, supporting rates from 12 Mbps, 480 Mbps to 40 Gbps (for USB 2.0 see, for example, "Universal Serial Bus Specifications", Compaq Computer Corporation, Hewlett-Packard Company, Intel Corporation, Lucent Technologies Inc, Microsoft Corporation, NEC Corporation, Koninklijke Philips Electronics N.V., rev. 2.0, Apr. 27, 2000, chapter 4: Architectural Overview"; for USB 3.2 see, for example, "Universal Serial Bus 3.2 Specification", Apple Inc., Hewlett-Packard Inc., Intel Corporation, Microsoft Corporation, Renesas Corporation, STMicroelectronics, Texas Instruments, Sep. 27, 2017, chapter 3: Architectural Overview).

USB devices and/or hosts include timebases. In some USB versions, a Start-of Frame (SOF) synchronization packet is transmitted once every 1 ms or once every 125 µS; the SOF frame includes a timestamp which may be used for timing synchronization between a USB host and a USB device. In other USB versions, the synchronization packet that the host sends may be Isochronous Timestamp Packets (ITPs).

Host USB control circuit 110 includes a USB timebase 116, operable to keep track of a USB timebase, and a USB data multiplexer/demultiplexer 118, which selects a data source to be transmitted over USB 114 and routes ingress USB data to various destinations (e.g., registers) within the host USB control circuit (host USB control circuit typically includes numerous other circuits (including serial to parallel and parallel to serial converters, encoders, decoders, security circuits and many others; such additional circuits are not shown in FIG. 1, for the sake of conceptual clarity).

SOC 100 further includes a secondary timebase 118, which is coupled to USB timebase 116, and a time synchronization control (STC) 120. The STC synchronizes the secondary timebase to the USB timebase. In some embodiments, when the host USB control circuit sends a synchronization packet (e.g., an SOF, or an ITP) over the USB, the TSC synchronizes the secondary timebase to the USB timebase. In other embodiments, the STC does not directly synchronize the secondary timebase to the USB timebase; instead, when a synchronization packet is sent or received, the SOC stores the USB and SOC timebases (or the difference between the timebases) in registers, which the SOC can then use to align other USB timestamps that the SOC may receive to the SOC timebase (typically, the CPU will convert all USB timestamps to corresponding SOC timestamps by adding the difference between the registers to the USB timestamps).

Thus, according to the example embodiment illustrated in FIG. 1, SOC 100 periodically synchronizes with the USB timebase, and may relate timed events in USB devices to the USB primary timebase.

The structure of SOC 100 illustrated in FIG. 1 and described herein is an example that is cited for the sake of conceptual clarity. Other structures may be used in alternative embodiments, including, for example, embodiments wherein the SOC comprises a device USB control circuit; in some embodiments, TSC 120 directly synchronizes USB timebase 116 to primary timebase 104, with no secondary timebase 118. In embodiments, the TSC synchronizes the timebases gradually, e.g., by increasing or decreasing the rate of a timebase.

Figure 2A:
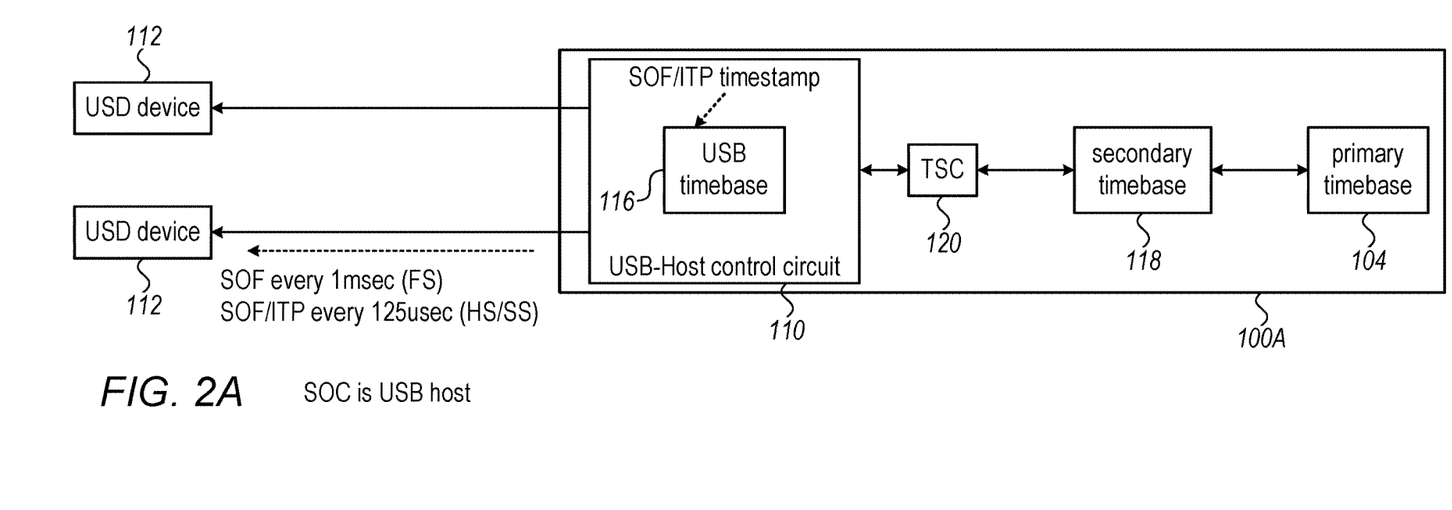
FIG. 2A is a block diagram that schematically illustrates USB time synchronization when the SOC is a USB host, in accordance with an embodiment that is described herein.

FIG. 2A is a block diagram that schematically illustrates USB time synchronization when the SOC is a USB host, in accordance with an embodiment that is described herein. An SOC 100A includes a primary timebase 104, which is synchronized to one or more secondary timebases 118, a USB-host interface 110 and a TSC 120. The USB-host interface 110 includes a USB timebase 116.

SOC 100A is coupled, through a USB, to USB devices 112. Any USB protocol may be used, including (but not limited to) 12 Mbps Full-Speed (FS), 460 Mbps High-Speed (HS) 5 Gbps Super-Speed (SS) and higher (existing and future) USB speeds.

The USB-host control circuit periodically sends synchronization packets that include a timestamp to the USB devices. Depending in the USB type, the synchronization packet may be, for example, a Start of Frame (SOF) packet, or an Isochronous Timestamp Packet (ITP), transmitted once every 128 µs, or once every 1 ms. In some embodiments, the timestamps that the synchronization packet sends include a USB frame number.

When the USB-Host controller sends a synchronization packet, TSC 120 synchronizes the USB timebase to the SOC's secondary timebase 118. In some embodiments, the TSC stores the USB timebase 116 and the local timebase 118 at the time that the USB-host control circuit sends the synchronization packet; in other embodiments, the TSC may store the difference between the timebases.

Figure 2B:
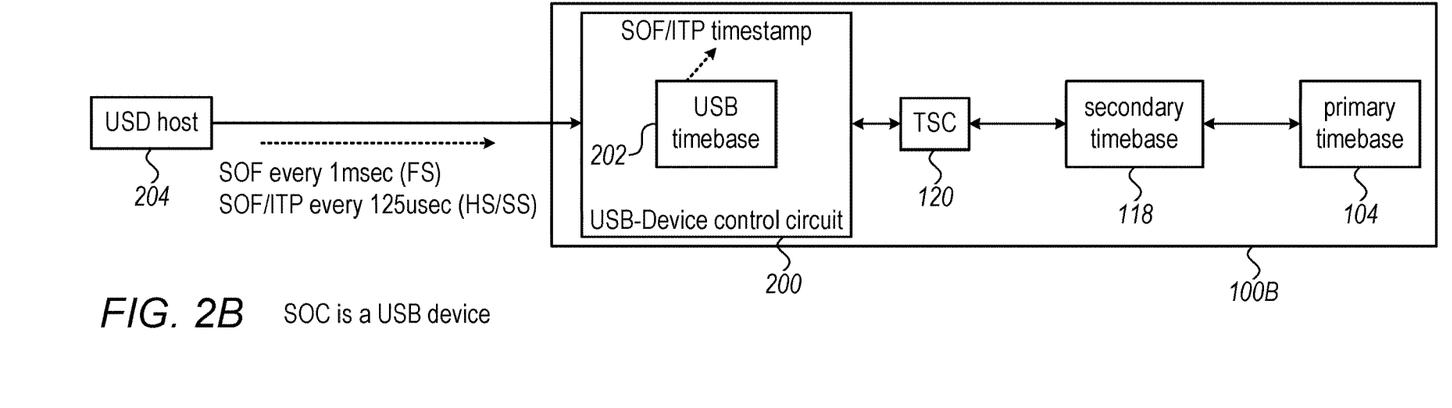
FIG. 2B is a block diagram that schematically illustrates USB time synchronization when the SOC is a USB device, in accordance with an embodiment that is described herein.

FIG. 2B is a block diagram that schematically illustrates USB time synchronization when the SOC is a USB device, in accordance with an embodiment that is described herein. An SOC 100B includes a primary timebase 104, (which is synchronized to one or more secondary timebases 118), a TSC 120 and a USB-device interface 200.

SOC 100B is coupled through a USB to USB host 204, which sends SOF or ITP synchronization packets over a USB to SOC 100B. Any type of USB protocol may be used, including FS, HS and SS.

The USB-host control circuit periodically sends synchronization packets to the USB devices. Depending on the USB type, the synchronization packet may be a Start of Frame (SOF) packet, or an Isochronous Timestamp Packet (ITP), transmitted once every 1 ms, or once every 128 µs.

When USB-device control circuit 200 receives a synchronization packet from USB host 204, TSC 120 synchronizes USB timebase 202 to secondary timebase 118 (which is periodically synchronized to primary timebase 104). In an embodiment, when the USB-device control circuit receives the synchronization packet, the TSC stores the USB timebase 202 and the local timebase 118; in another embodiment, the TSC stores the difference between the timebases.

The structures of SOCs 100A and 100B, illustrated in FIGS. 2A and 2B, are examples that are cited for the sake of conceptual clarity. Other structures may be used in alternative embodiments. In some embodiments, the SOC timebase does not synchronize to the USB timebase whenever the USB-host sends a synchronization packet—instead, the SOC may skip synchronization packets, for example, when the SOC's workload is high; in some embodiments, the SOC may synchronize on every nth (e.g., 8) synchronization packet.

Figure 3:
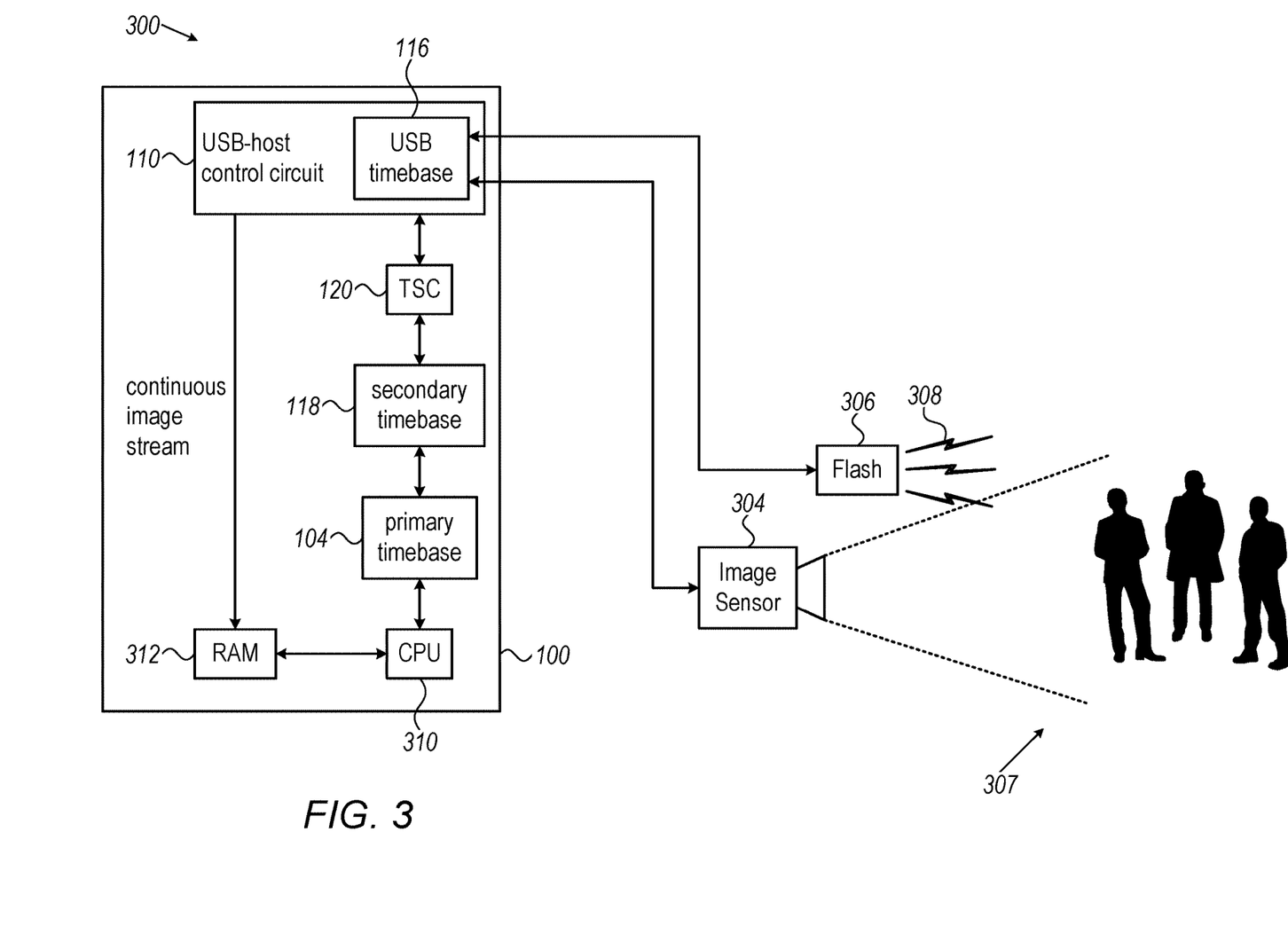
FIG. 3 is a block diagram that schematically illustrates a photography system, including an SOC, an image sensor and a USB flash light-source, in accordance with an embodiment that is described herein.

FIG. 3 is a block diagram that schematically illustrates a photography system 300, including an SOC 100, an image sensor 302 and a USB flash light-source 306, in accordance with an embodiment that is described herein. (The term "flash" is ambiguous, and it may be used for flash light-source and for a type of non-volatile memory. In this disclosure, the term "flash" will refer solely to a flash light-source, used in photography.)

As described above (with reference to FIGS. 1 and 2A), SOC 100 includes a primary timebase 104, which is periodically synchronized to a secondary timebase 118, and a TSC 120, which is coupled to the secondary timebase and to a USB-host control circuit 110. The USB-host control circuit includes a USB timebase 116; the TSC synchronizes the secondary timebase to the USB timebase whenever the USB sends a synchronization packet to a USB device.

According to the example embodiment illustrated in FIG. 3, system 300 includes a USB image sensor and a USB flash 304, which are coupled to USB-host control circuit 110 of SOC 100. A user may wish to capture a dark scene 307, using image sensor 304. To illuminate the scene, the user activates flash 306, which generates a flash of light 308. Both image sensor 304 and flash 306 are USB devices that are coupled to the SOC's USB-host control circuit 110. SOC 100 may be installed, for example, in a computer; to take a picture, the user may setup a camera application and then hit a Capture button on a touchscreen (not shown). A Central-Processing Unit (CPU) 310 in the SOC will then setup image sensor 304 to capture images, and will send a trigger command to flash 306, which will generate a flash of light, to illuminate the scene.

USB-host control circuit 110 sends synchronization packets to the USB devices, including image sensor 304 and flash 306. In some embodiments, the flash of light delays after the flash trigger, and the flash sends the timestamp corresponding to the flash of light back to the USB-host control circuit. Image sensor 304 may embed timestamps in the video stream that the image sensor sends over the USB.

As explained above, TSC 120 synchronizes secondary timebase 118 to the USB timebase 116 when the USB-host control circuit sends a synchronization packet over the USB. Thus, CPU 310 can correlate the time in which the flash is active to the images stream that the CPU receives from the image sensor.

The configuration of system 300 illustrated in FIG. 3 and described above is an example that is cited for conceptual clarity. Other configurations may be used in alternative embodiment. For example, in some embodiments SOC 100 includes a USB-device control circuit, and the USB host is external. In some embodiment, the image sensor is coupled to the SOC using a low-power bus (e.g., Camera Serial Interface 2, or CSI2), which time-synchronizes to the SOC by other means.

Types of USB Synchronization Packets

USB provides several mechanisms for timekeeping: i) USB 2 data has synchronization points at SOF (Start-of-frame) packets. A USB 2 SOF packet includes an 11-bit Frame-Number and an 8-bit Packet ID (PID) (in addition to Cyclic Redundancy Check bits) and is transmitted once every 1 ms. ii) USB 3 uses the ITP (Isochronous Timestamp Packet) to provide the same synchronization points. The 128-bit ITP includes a 27-bit timestamp and a 14-bit bus-interval counter, which is incremented every 125 µsecond. ii) USB 3 has an optional PTM mechanism that uses Link Delay Measurement (LDM) packets to increase the accuracy of the data provided in the ITP packets (this would be especially important across hubs).

In embodiments, the SOC timebase can synchronize to any of the USB timekeeping mechanisms, with an error that is less than or equal to 0.5 µs.

Retroactive Synchronization

In the example embodiment illustrated in FIG. 3 and described hereinabove, the synchronization of the USB timebase to the SOC timebase enables "retroactive synchronization" of the flash timing to the camera timing. In the context of the present disclosure, retroactive synchronization refers to the case where real time synchronization is hard to do but, as some or all the events to be synchronized are recorded, the synchronization of the timebases may be used, at a later point in time, to find the timing relationship between the events. For example, in photography system 300, SOC 100 continuously stores in RAM 312 images with timestamps that image sensor 304 sends, and stores flash-event timestamps that flash 306 sends. As the timebases are synchronized to the SOC timebase, CPU 310 can correlate the flash event to a corresponding picture in RAM 312.

Use-Case Examples of USB Timebase Synchronization

Other use-examples of USB timebase synchronization include (but are not limited to): i) synchronization of USB audio to video; ii) image stabilization (which includes detecting movement via a gyroscope/accelerometer and correlating the movement to data captured by the camera); iii) iPad synchronization to external high end video editing systems; iv) synchronization of a high end camera system to a simpler camera; v) lining up phase of multiple USB audio devices (e.g., stereo speakers, built in speakers, homepod, Apple TV etc.).

Figure 4:
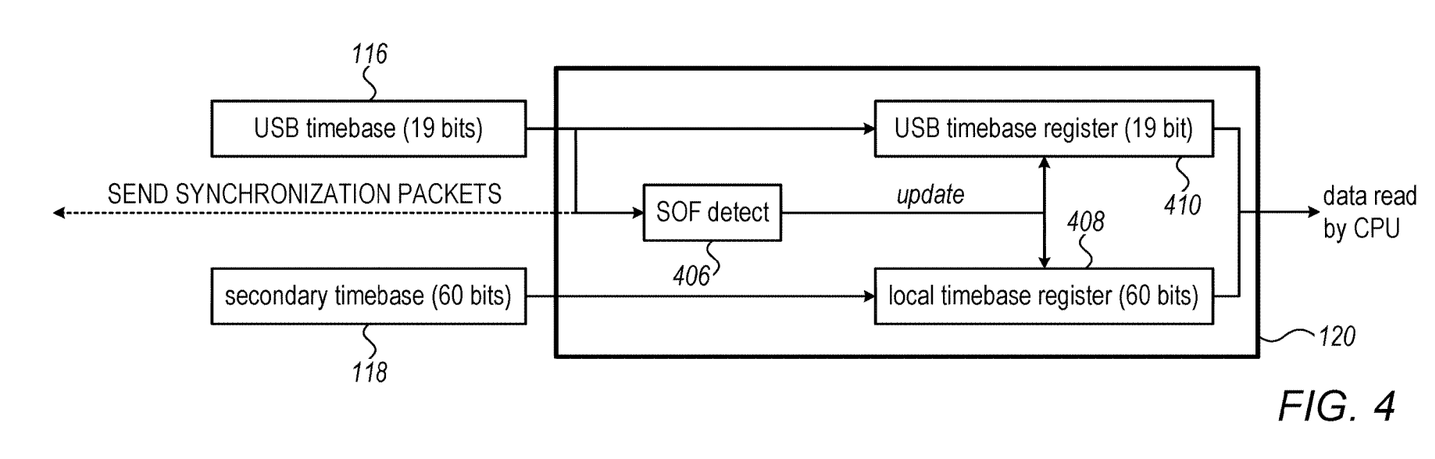
FIG. 4 is a block diagram that schematically illustrates the structure of a Time-Synchronization Controller (TSC), which synchronizes the host-USB and the device-USB timebases, in accordance with an embodiment that is described herein.

FIG. 4 is a block diagram that schematically illustrates the structure of time-synchronization controller (TSC) 120, which synchronizes the host-USB and the device-USB timebases, in accordance with an embodiment that is described herein.

Secondary timebase 118, (FIG. 1) counts the SOC time (and may be periodically synchronized to the SOC's primary timebase 104). USB timebase 116 (FIG. 1) counts the USB time. According to the example embodiment illustrated in FIG. 4, the local timebase is a 60-bit number, whereas the USB timebase is a 19-bit number (USB 2).

An SOF-detection circuit 406 detects when the USB timebase changes the frame number and controls a secondary-timebase register 118 and a USB timebase register 410 to store the values of the USB timebase and the secondary timebase, respectively. (The USB-host control circuit will also send a synchronization packet to the USB devices, responsively to the change of the frame number in the USB timebase.)

Thus, whenever the frame number of the USB timebase changes, registers 408 and 410 store the momentary values of the local timebase and the timebase registers. The values of the registers may be used by a CPU (e.g., CPU 310, FIG. 3) to calculate the difference between the timebases, in effect, synchronizing the two timebases.

TSC 120 may further include inter-clock-domain synchronization circuits (e.g., between USB timebase 404 and SOF detect 406). Such circuits are not shown in FIG. 4, for the sake of simplicity.

The values of registers 408, 410 that the CPU reads must be coherent even if the CPU reads the registers while the registers latch a new value. This can be assured by several hardware and software techniques (e.g., reading the registers twice, and if the two readings do not match, read again).

Figure 5:
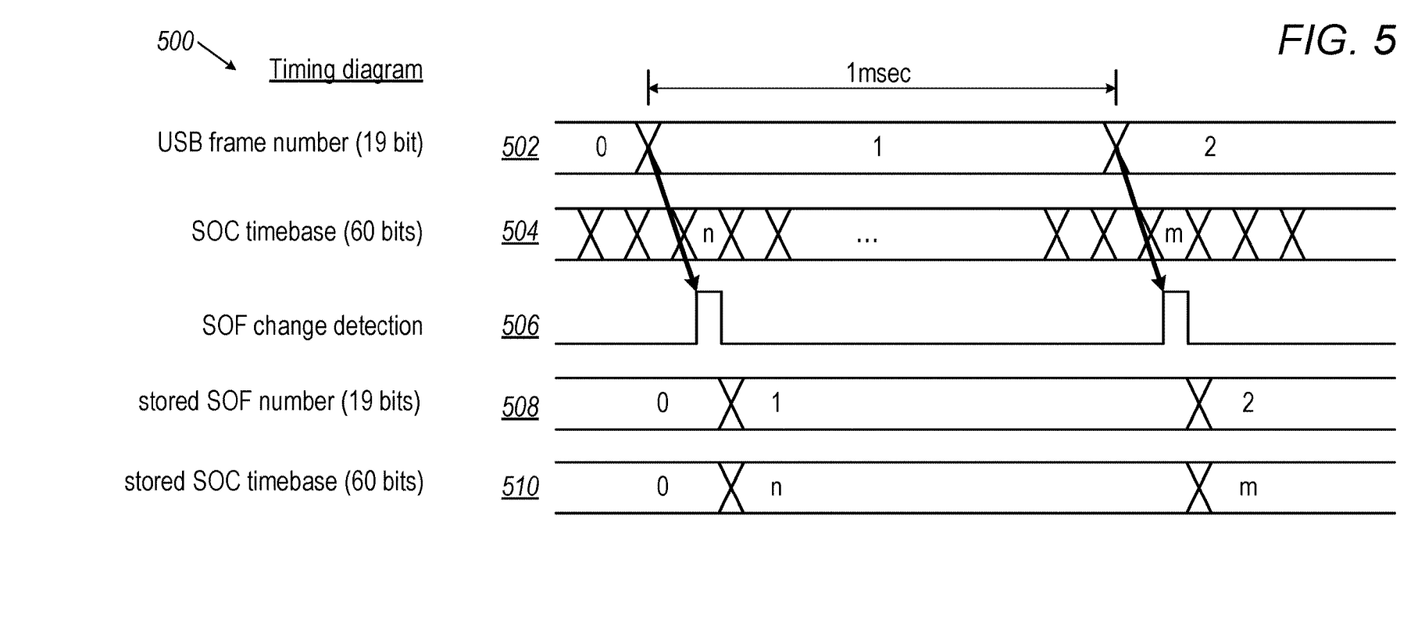
FIG. 5 is a timing diagram the schematically illustrates a waveform of USB timebase to local timebase synchronization, in accordance with an embodiment that is described herein.

FIG. 5 is a timing diagram that schematically illustrates a waveform 500 of USB timebase to local timebase synchronization, in accordance with an embodiment that is described herein. A USB timebase 502 counts USB frame numbers, and an SOC timebase 504 counts the SOC local time. An SOF detection 506 pulses responsively to frame changes in USB timebase 502. Responsive to the pulses of 506, a stored-SOF number 508 registers the USB frame number, and a stored SOC timebase 510 stores the SOC timebase at the time that the USB frame number changes.

The structure of TSC 400 and the corresponding waveform 500, illustrated in FIGS. 4, 5 and described above are cited by way of example. Other TSCs, some with different waveforms, may be used in alternative embodiments. For example, in USB 2 the SOF detect circuit 406 detects when a Bus Interval Counter field of the USB timebase changes. In another example, in USB 3 ITP, the synchronization frequency and the number of bits may be different. In some embodiments, rather than storing the values of the two timebases in two registers, the time synchronization circuit stores a difference between the two timebases in a single register.

Figure 6:
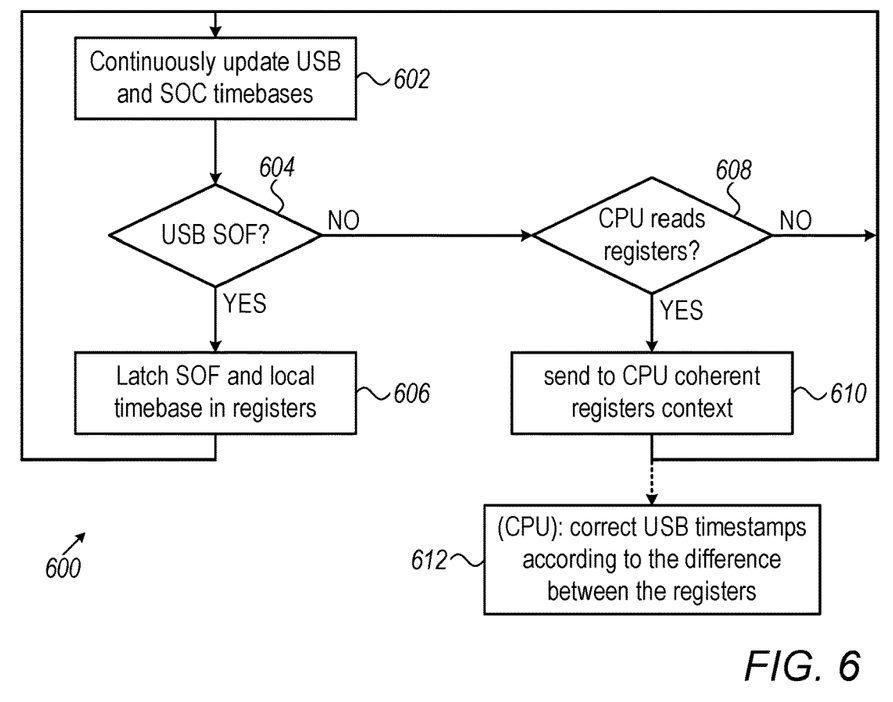
FIG. 6 is a flowchart that schematically illustrates a method for the synchronization of a USB timebase to an SOC timebase, in accordance with an embodiment that is described herein.

FIG. 6 is a flowchart that schematically illustrates a method 600 for the synchronization of a USB timebase to an SOC timebase, in accordance with an embodiment that is described herein. The flowchart is executed mainly by TSC 120 (FIGS. 1 and 4), by timebases 116, 118 and, in part, by a CPU (e.g., CPU 310, FIG. 3).

The flowchart starts at a continuous timebase update stage 602, wherein the timebases, including a USB timebase and an SOC timebase, continuously update. Both timebases are updated separately, e.g., by different oscillators and, due to inaccuracies, may drift from each other over time. Next, at a Check USB SOF stage 604, the TSC checks if the USB timebase has reached a Start-of-Frame event. If so, the TSC enters a Latch SOF and Local Timebase stage 606 and latches the values of the USB and the SOC timebases in registers. The TSC then reenters stage 602 and resumes the continuous update of the timebases.

If, in stage 604, the USB timebase has not reached a Start-of-Frame event, the TSC proceeds to a Check CPU Read Request stage 608, and checks if the CPU is accessing the registers. If so, the TSC sends a coherent value of the registers to the CPU. After stage 610 (and, if the CPU is not requesting to read the registers, after stage 608), the TSC reenters stage 602 and resumes the continuous update of the timebases.

After stage 610, the CPU may enter a Correct USB Timestamps stage 612 and correct further (or past) USB timestamps according to the difference between the two registers.

Thus, according to the example embodiment illustrated in FIG. 6, the TSC can synchronize the USB timebase to the SOC timebase by latching the timebases in registers responsive to an SOF event, and the CPU may then align USB timestamps to the SOC timebase according to the difference between the registers.

The flowchart illustrated in FIG. 6 and described hereinabove is an example embodiment that is cited for the sake of conceptual clarity. Other flowcharts may be used in alternative embodiments. For example, in some embodiments, stages 602, 604 and 608 are merged to a single stage, in which both timebases are continuously updated and, at the same time, USB SOF events and CPU read-registers request events are continuously monitored. In an embodiment, stage 602 is always executed, concurrently to all other stages. In some embodiment, the TSC, in stage 604, looks for an ITP rather than an SOF.

Although the embodiments described herein mainly address USB to SOC timebase synchronization, the methods and systems described herein can also be used in various other applications.

Figure 7:
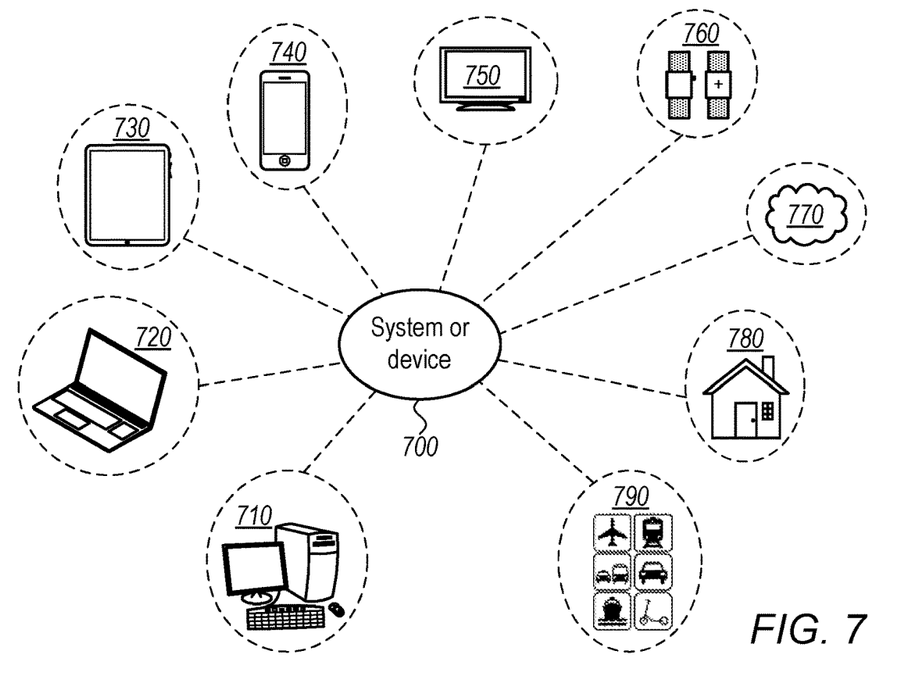
FIG. 7 is a diagram that schematically illustrates various types of systems that may include any of the circuits, devices, or system discussed above, in accordance with embodiments that are described herein.

FIG. 7 is a diagram 700 that schematically illustrates various types of systems that may include any of the circuits, devices, or system discussed above, in accordance with embodiments that are described herein. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
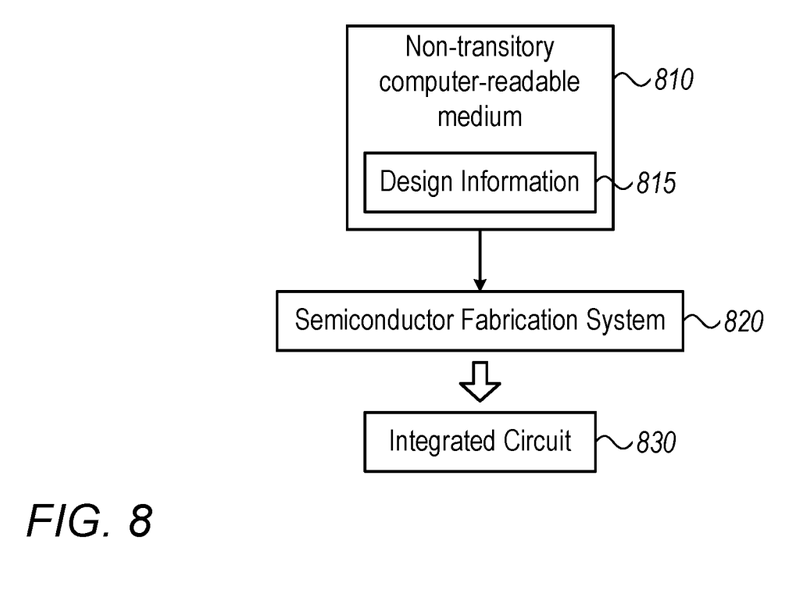
FIG. 8 is a block diagram illustrating an example non-transitory computer-readable storage medium that stores circuit design information, in accordance with embodiments that are described herein.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 610 and fabricate integrated circuit 830 based on the design information 815.

Non-transitory computer-readable storage medium 810, may include any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1, 2, 3, and 5. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or constitute hardware that includes various types of circuit elements, such as combinatorial logic, clocked storage devices (e.g., flip-flops, registers, latches, etc.), machines, memory (e.g., random-access memory, embedded dynamic random-access memory), programmable logic arrays, and so on. Circuitry may be custom designed, or taken from standard libraries. In various implementations, circuitry can, as, appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of: "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An Integrated Circuit (IC), comprising:
   one or more processors;
   a timebase circuit, which is configured to provide a first timebase indicative of a time measurement within the IC;
   an interface, which is configured to be coupled to one or more devices, wherein transmissions on the interface adhere to a communication protocol having a second timebase that is specific to the communication protocol and is different from the first timebase; and
   a Time Synchronization Circuit (TSC), configured to generate from the communication protocol a second timestamp representing a point in time on the interface in accordance with the second timebase, and to concurrently generate a first timestamp based on the first timebase representing the point in time in accordance with the first timebase, wherein the first timestamp and the second timestamp correlate time on the interface.

2. The IC according to claim 1, wherein, in accordance with the communication protocol, the transmissions on the interface are logically divided into a plurality of frames, and wherein time on the interface is defined based on frame numbers assigned to the frames in the plurality of frames.

3. The IC according to claim 2, wherein, to generate the second timestamp from the communication protocol, the TSC is configured to identify a frame number corresponding to the point in time and to generate the second timestamp based on the identified frame number.

4. The IC according to claim 2, wherein the TSC is configured to generate the second timestamp corresponding to the point in time at which the frame number on the interface changes.

5. The IC according to claim 2, wherein the TSC comprises a Start-of-Frame (SOF) detection circuit, configured to detect an SOF indicating a change in the frame number on the interface, and wherein the TSC is configured to generate the first timestamp and the second timestamp responsively to detection of the SOF.

6. The IC according to claim 1, wherein the interface is a Universal Serial Bus (USB).

7. The IC according to claim 1, wherein the interface is Universal Serial Bus 2 (USB 2), and wherein the TSC is configured to generate the second timestamp corresponding to the point in time at which the interface sends a Start-Of-Frame (SOF) packet.

8. The IC according to claim 1, wherein the interface is Universal Serial Bus 3 (USB 3), and wherein the TSC is configured to generate the second timestamp corresponding to the point in time at which the interface sends an Isochronous Timestamp Packet (ITP).

9. The IC according to claim 8, wherein the interface is configured to send Link Delay Measurement (LDM) packets to increase an accuracy of the ITP.

10. The IC according to claim 1, wherein the one or more processors comprise at least one component type selected from a group of types consisting of (i) a Reduced Instruction-Set Processor (RISC), a Digital Signal Processor (DSP) and a wireless modem.

11. The IC according to claim 1, further comprising a CPU that is configured to send a read request to the TSC, wherein the TSC is configured to send a coherent capture of the first timestamp and the second timestamp responsively to the read request.

12. A method in an Integrated Circuit (IC), the method comprising:
    using a timebase circuit, providing a first timebase indicative of a time measurement within the IC;
    communicating between the IC and one or more devices via an interface, wherein transmissions on the interface adhere to a communication protocol having a second timebase that is specific to the communication protocol and is different from the first timebase; and
    using a Time Synchronization Circuit (TSC), generating from the communication protocol a second timestamp representing a point in time on the interface in accordance with the second timebase, and concurrently generating a first timestamp representing the point in time in accordance with the first timebase, wherein the first timestamp and the second timestamp correlate time on the interface.

13. The method according to claim 12, wherein, in accordance with the communication protocol, the transmissions on the interface are logically divided into a plurality of frames, and wherein time on the interface is defined based on frame numbers assigned to the frames in the plurality of frames.

14. The method according to claim 13, wherein generating the second timestamp from the communication protocol comprises identifying a frame number corresponding to the point in time and generating the timestamp based on the identified frame number.

15. The method according to claim 13, wherein generating the second timestamp comprises generating the second timestamp corresponding to the point in time at which the frame number on the interface changes.

16. The method according to claim 13, wherein generating the second timestamp comprises detecting a Start-of-Frame (SOF) indicating a change in the frame number on the interface, and generating the second timestamp and the second timestamp responsively to detection of the SOF.

17. The method according to claim 12, wherein the interface is a Universal Serial Bus (USB).

18. A system, comprising:
    one or more devices; and
    an Integrated Circuit (IC), comprising:
      one or more processors;

a timebase circuit, which is configured to provide a first timebase indicative of a time measurement within the IC;

an interface, which is configured to be coupled to the one or more devices, wherein transmissions on the interface adhere to a communication protocol having a second timebase that is specific to the communication protocol and is different from the first timebase; and a Time Synchronization Circuit (TSC), configured to generate from the communication protocol a second timestamp representing a point in time on the interface in accordance with the second timebase, and to concurrently generate a first timestamp representing the point in time in accordance with the first timebase, wherein the first timestamp and the second timestamp correlate time on the interface.

19. The system according to claim 18, wherein the one or more devices comprise at least one device type selected from a list of types consisting of a camera, an audio device, and a storage device.

\* \* \* \* \*